(12) United States Patent
Nieuwoudt (10) Patent No.: US 6,814,220 B1
(45) Date of Patent: Nov. 9, 2004

(54) RETAINING DEVICE FOR A CONVEYOR BELT ASSEMBLY

(76) Inventor: Jan Harmes Nieuwoudt, 75B Tarentaal Street, Nina Park Ext. 3, 0156 Pretoria (ZA)

( * ) Notice: Subject to any disclaimer, the term of this patent is extended or adjusted under 35 U.S.C. 154(b) by 0 days.

(21) Appl. No.: 10/470,168
(22) PCT Filed: Jan. 25, 2000
(86) PCT No.: PCT/ZA00/00012
§ 371 (c)(1),
(2), (4) Date: Jul. 23, 2003
(87) PCT Pub. No.: WO01/55013
PCT Pub. Date: Aug. 2, 2001

(51) Int. Cl.[7] .............................................. B65G 43/00
(52) U.S. Cl. .................. 198/502.1; 198/323; 198/502.4
(58) Field of Search .......................... 198/502.1, 502.4, 198/810.02, 323

(56) References Cited

U.S. PATENT DOCUMENTS 5,083,656 A * 1/1992 Craig ....................... 198/502.4

FOREIGN PATENT DOCUMENTS

SU 1541158 * 2/1990 .............. 198/502.1

OTHER PUBLICATIONS

Database WPI, Section PQ, Week 8949, Jan. 24, 1990; Derwent Publications Ltd., London, GB; AN 89-363388; ZP002147156 & SU 1 467 005 A (Syzransk Trubo Cons) Mar. 23, 1989; abstract.

Database WPI, Section PQ, Week 8646, Nov. 27, 1986; Derwent Publications Ltd., London GB; AN 86-303872; ZP002147157 & SU 1 219 489 A (Skochinskii Mining Inst), Mar. 23, 1986, abstract.

SU 179 666 A (I. Gridin, et al.); Apr. 12, 1966; see "extrait de brevet Russe" provided by Derwent.

DE 10 45 321 B (Siemag Maschinen– Undstahlbau Netphen GMBH); col. 1, line 54 col. 3, line 27 figures 1–3.

DE 24 19 097 A (Hammerwerk Richard Nascher); Oct. 30, 1975; p. 7, line 1 p. 10, line 15 figures 1–4.

DE 296 11 306 U (Rheinbraun AG) oct. 2, 1996; p. 4, line 15 p. 5, line 19 figure.

* cited by examiner

Primary Examiner—James R. Bidwell
(74) Attorney, Agent, or Firm—Knobbe Martens Olson & Bear LLP (57) ABSTRACT

A retaining device (10) for a conveyor belt assembly (12) which includes a clamping means (14) for clamping a conveyor belt (36) of the conveyor belt assembly, and a biasing means (38,40) for displacing the clamping means between an inoperative condition and an operative retaining condition wherein the clamping means clamps a part of the belt to tension a material carrying portion of the belt in the event of a loss of tension in the belt.

16 Claims, 11 Drawing Sheets

RETAINING DEVICE FOR A CONVEYOR BELT ASSEMBLY

FIELD OF THE INVENTION

This invention relates to a retaining device for a conveyor belt assembly.

BACKGROUND OF THE INVENTION

A problem associated with a conventional conveyor belt assembly may occur when the belt breaks resulting for example, in spillage of the matter or articles carried by the belt assembly onto the floor thereby leading to a substantial down-time of the assembly. In particular, fixing of the belt would include first removing all the remaining material off the belt, pulling the ends of the belt together over what may be a significant distance depending on the length of the belt and thereafter resplicing the ends of the belt together. The applicant believes that a need exists for a retaining device which would limit the travel of the belt upon breakage of the belt thereby preventing a major portion of the belt from landing on the floor and consequent spillage of material.

SUMMARY OF THE INVENTION

According to the invention there is provided a retaining device for a conveyor belt assembly which includes:

a clamping means for clamping a conveyor belt of the conveyor belt assembly; and a biasing means for displacing the damping means between an inoperative condition and an operative retaining condition wherein the clamping means clamps a part of the belt to tension a material carrying portion of the belt in the event of a loss of tension in the belt.

The clamping means may include a support member and a clamping member which is mounted displaceably thereon. The clamping member may be pivotally or slidably mounted on the support member.

The support member may be mountable on a support frame of the conveyor.

Complementary clamping formations may be provided on the clamping and support members to facilitate clamping of the belt therebetween in the operative retaining condition. The clamping formations may be configured to span a major part of a width of the belt.

The clamping and support members may be generally "U"-shaped, the clamping member preferably being adapted to move the belt towards and in to engagement with the support member in the retaining condition.

The biasing means may include a weighted arm which is connected to the clamping member for displacing the clamping member towards the retaining condition under the operation of gravity.

DETAILED DESCRIPTION OF THE PREFERRED EMBODIMENT

The biasing means may alternatively include a spring arrangement which is adapted to displace the clamping member towards the support member in the operative retaining condition.

According to another aspect of the invention there is provided a conveyor belt assembly which includes one or more retaining devices as described herein. The retaining devices are preferably arranged on a support beam of the conveyor assembly, preferably within 20 meters, typically 3 meters, within a head or drive roller of the assembly. The retaining devices may be arranged on an upper- and/or under-side of the support beam.

BRIEF DESCRIPTION OF THE DRAWINGS

The invention will now be described by way of example with reference to the accompanying drawings.

In the drawings.

Referring now to the drawings, reference numeral 10 generally designates a retaining device for a conveyor belt assembly 12 in accordance with the invention.

The retaining device 10 includes a damping means comprising a damping member 14 which is mounted pivotally on a support member 16 by pivot members 18.

The support member 16 includes a pair of spaced side supports 20 each having three i legs, are connected to longitudinally extending beams 22 of a support frame of the conveyor assembly 12. The support member 16 further includes a rod or tube 24 which extends: between the upper end regions of the side supports 20.

Figure 1:
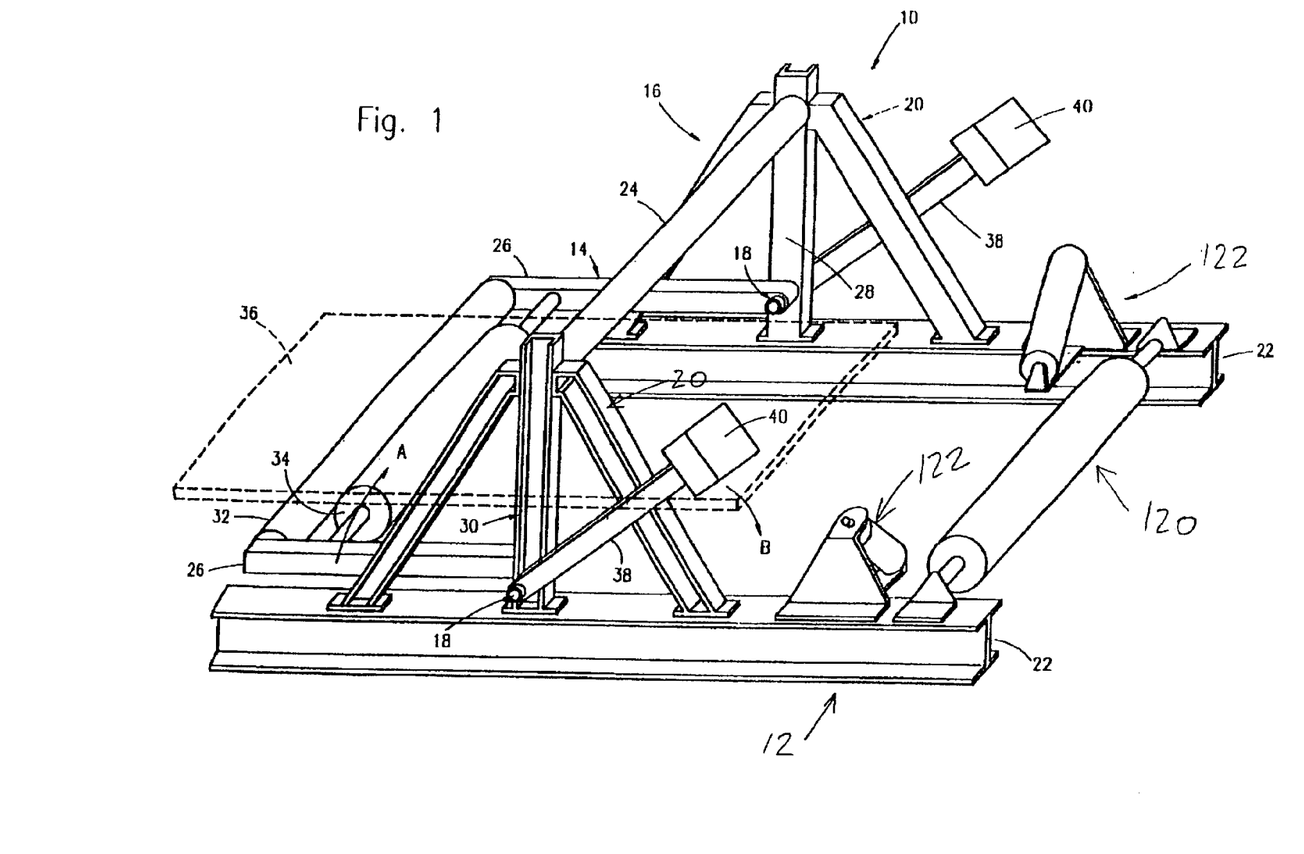
FIG. 1 shows a three dimensional view of a retaining device in accordance with the invention.
Figure 2:
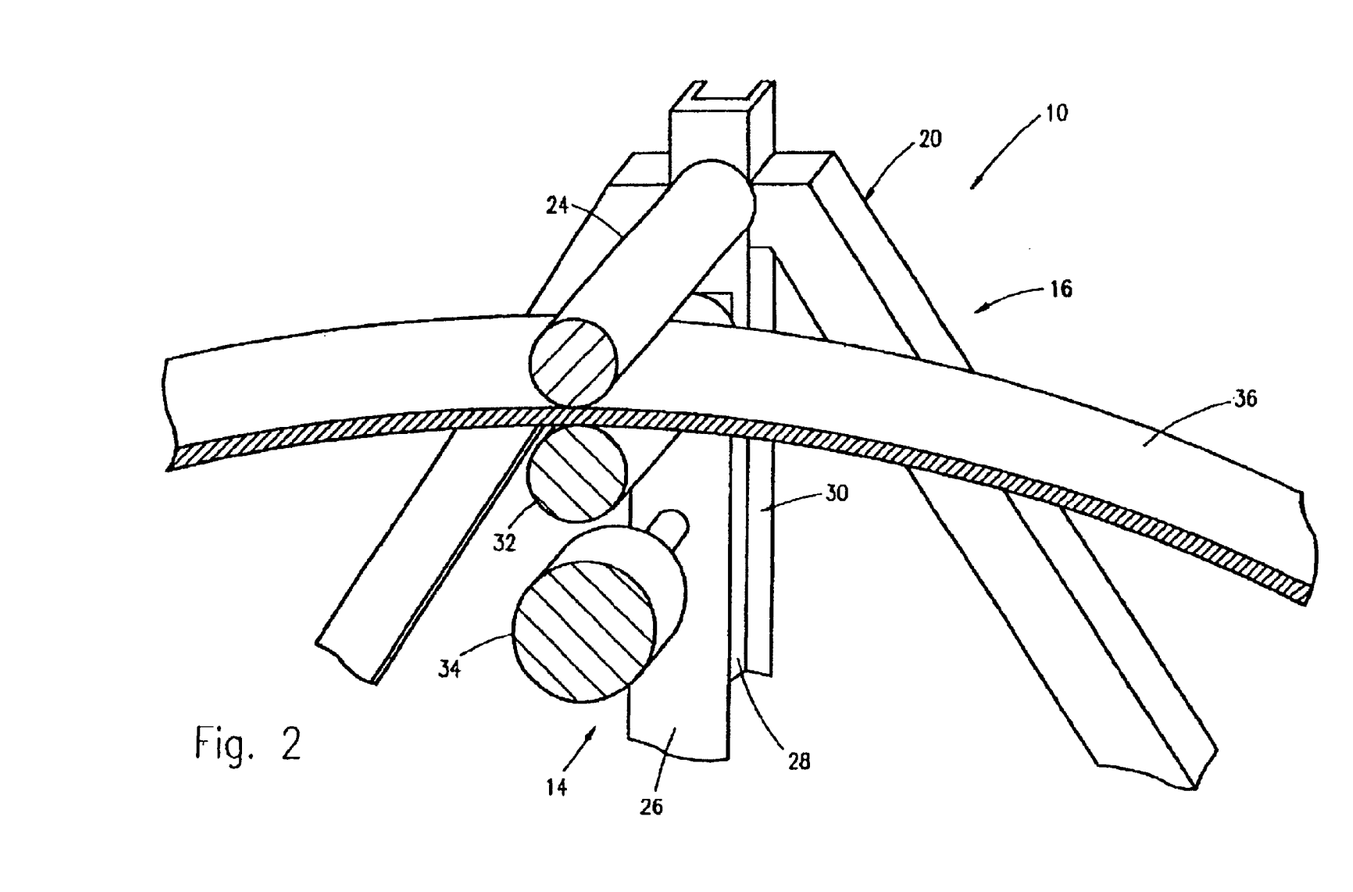
FIG. 2 shows a sectioned three dimensional view of the retaining device of FIG. 1.

The clamping member 14 includes a pair of side arms 26 which are pivotally connected at one of their ends to the inner sides 28 of the central legs 30 of the side supports 20. The clamping member 14 further includes a rod or tube 32 which extends between the other ends of the side arms 26. A guide roller 34 for supporting a belt 36 of the conveyor assembly 12 extends bee the side arms 26 at a position spaced away from the end of side arms 26 where the rod 32 is located. A biasing means in the form of extension arms 38 having weights 40 at their ends, are connected to the said one ends of the side arms 26 via the pivot members 18 for displacing the clamping member 14 between an inoperative condition (as shown in FIG. 1) and an operative retaining condition (as shown in FIG. 2) wherein the belt 36 is clamped between the rods 24 and 32 to tension a material carrying portion of the belt 36 in the event of a loss of tension in the belt 36. In particular, in the event that the belt 36 breaks, the loss in tension in the belt 36 permits pivotal displacement of the clamping member 14 and with it the belt 36, in the direction of arrow "A" towards the retaining condition by the biasing means as the extension arms 38 and weights 40 pivot towards the ground under the operation of gravity in the direction of arrow "B".

Referring now to FIGS. 3 to 11, reference numerals 110 and 112 generally refer to retaining devices for a conveyor belt assembly 12 in accordance with the invention. It is to be understood that like reference numerals used in FIGS. 1 and 2 shall refer to like parts in FIGS. 3 to 11, unless the contrary is clear from the context.

As is apparent from the drawings, retaining devices 110 and 112 are mounted respectively on an operative upper- and under-side of the beams 22 of the support frame of the conveyor assembly 12. In the case of the retaining device 112 however, the clamping member 14 does not require a biasing means in the form of extension arms 38 having weights 40 at their ends as is the case with retaining devices 10 and 110, since upon a loss of tension in the belt 36, the damping member 14 pivots naturally under the operation of gravity in the direction of arrow "C" towards the retaining condition shown in FIG. 5.

Figure 6:
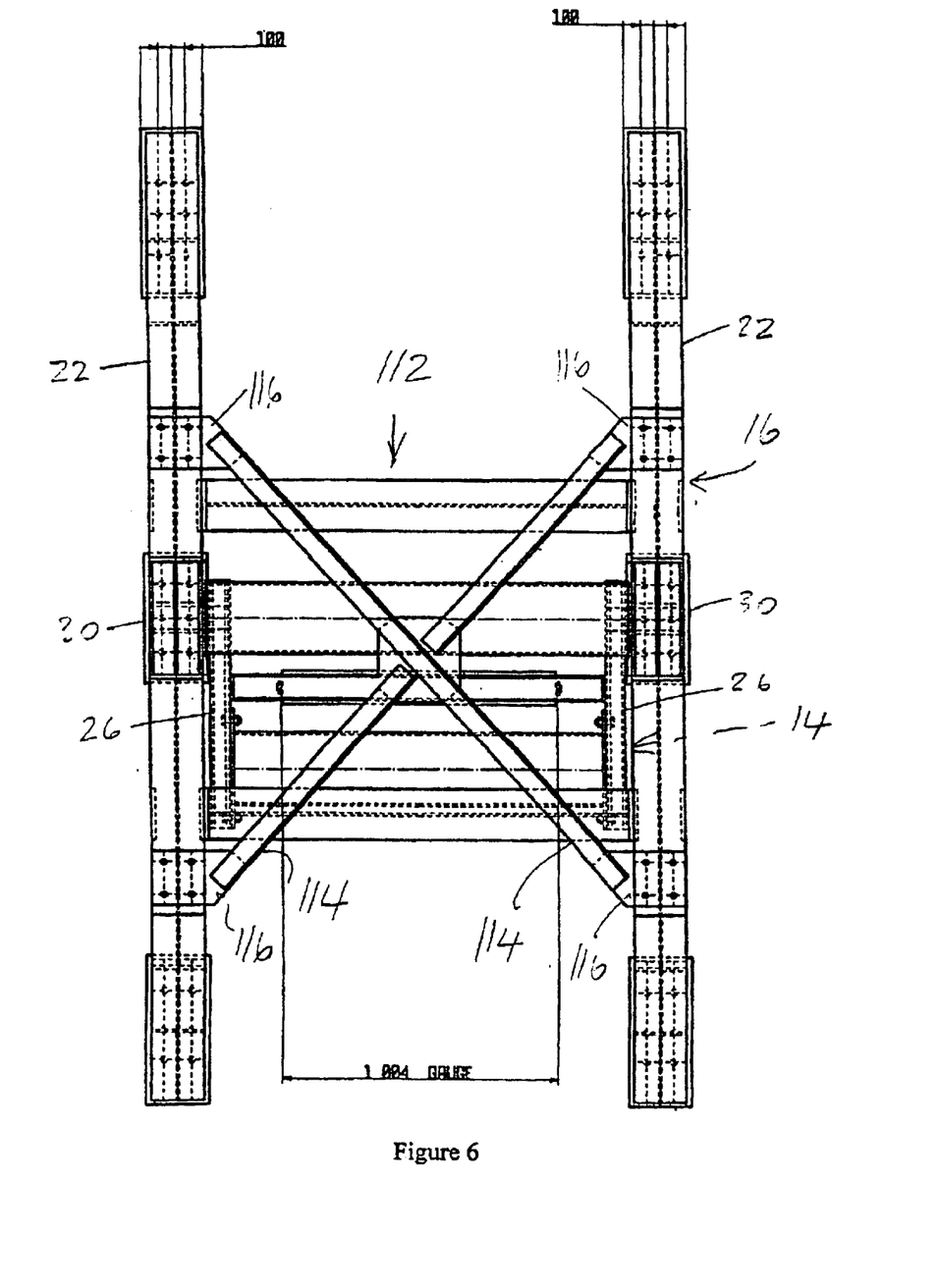
FIGS. 6 to 9 show enlarged top, bottom and end views of parts of the retaining devices shown in FIGS. 3 to 5 taken in the direction of the arrows shown along lines 6—6, 7—7, 8—8, 9—9, respectively as indicated in FIG. 3.
Figure 7:
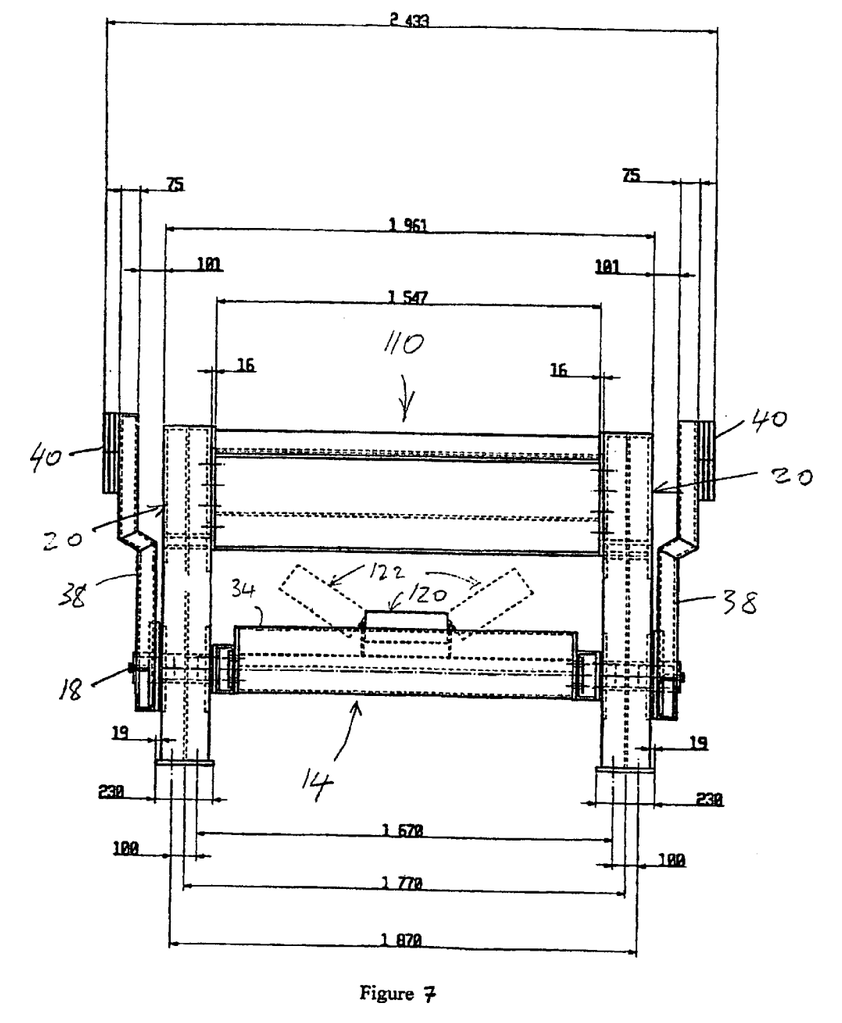
Figure 8:
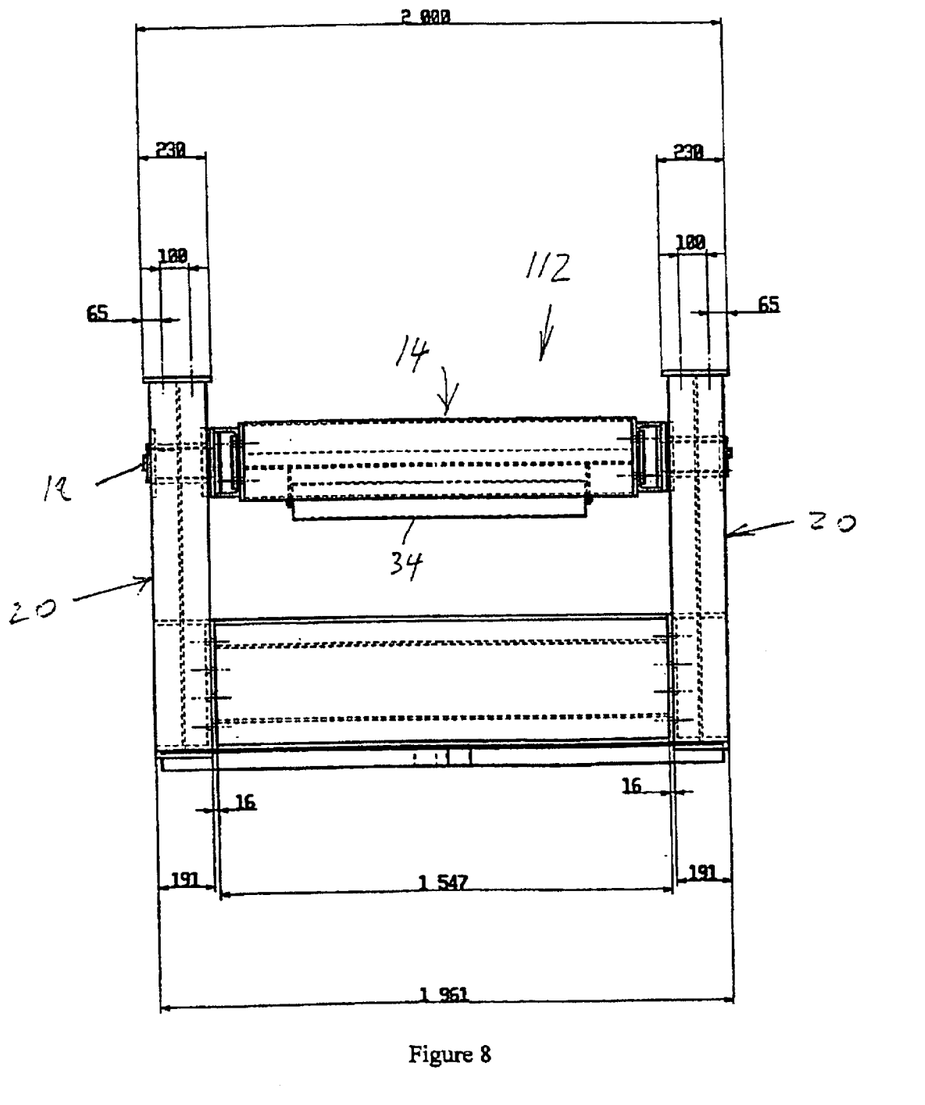
Figure 9:
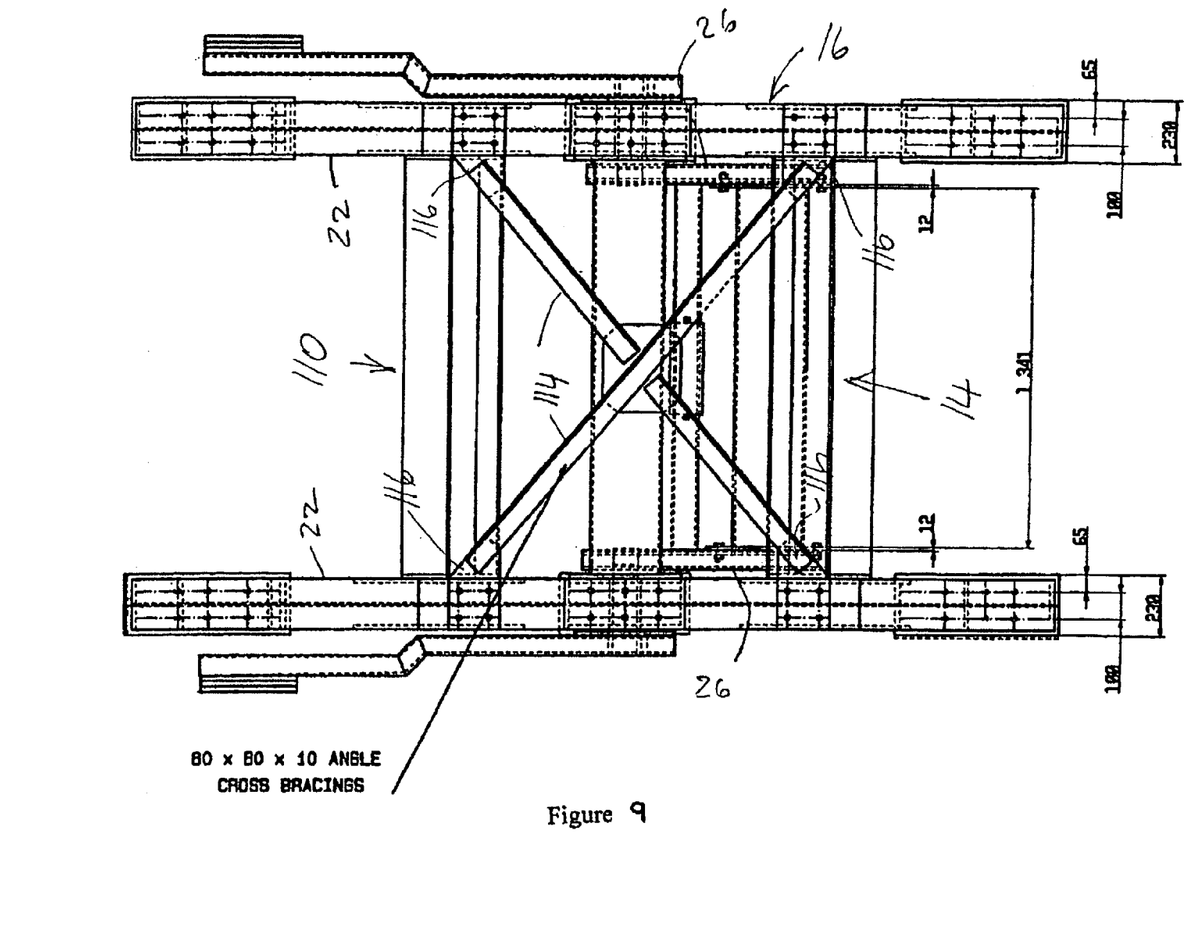
Figure 10:
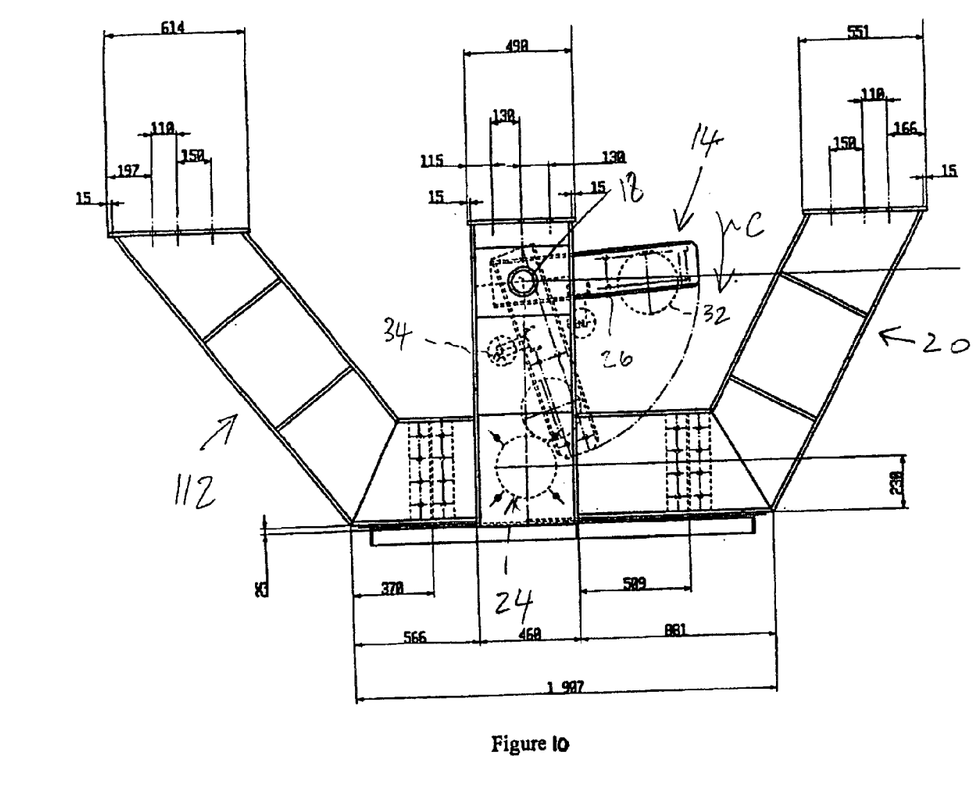
FIGS. 10 and 11 show enlarged front views of parts of the retaining devices shown in FIGS. 3 to 5.
Figure 11:
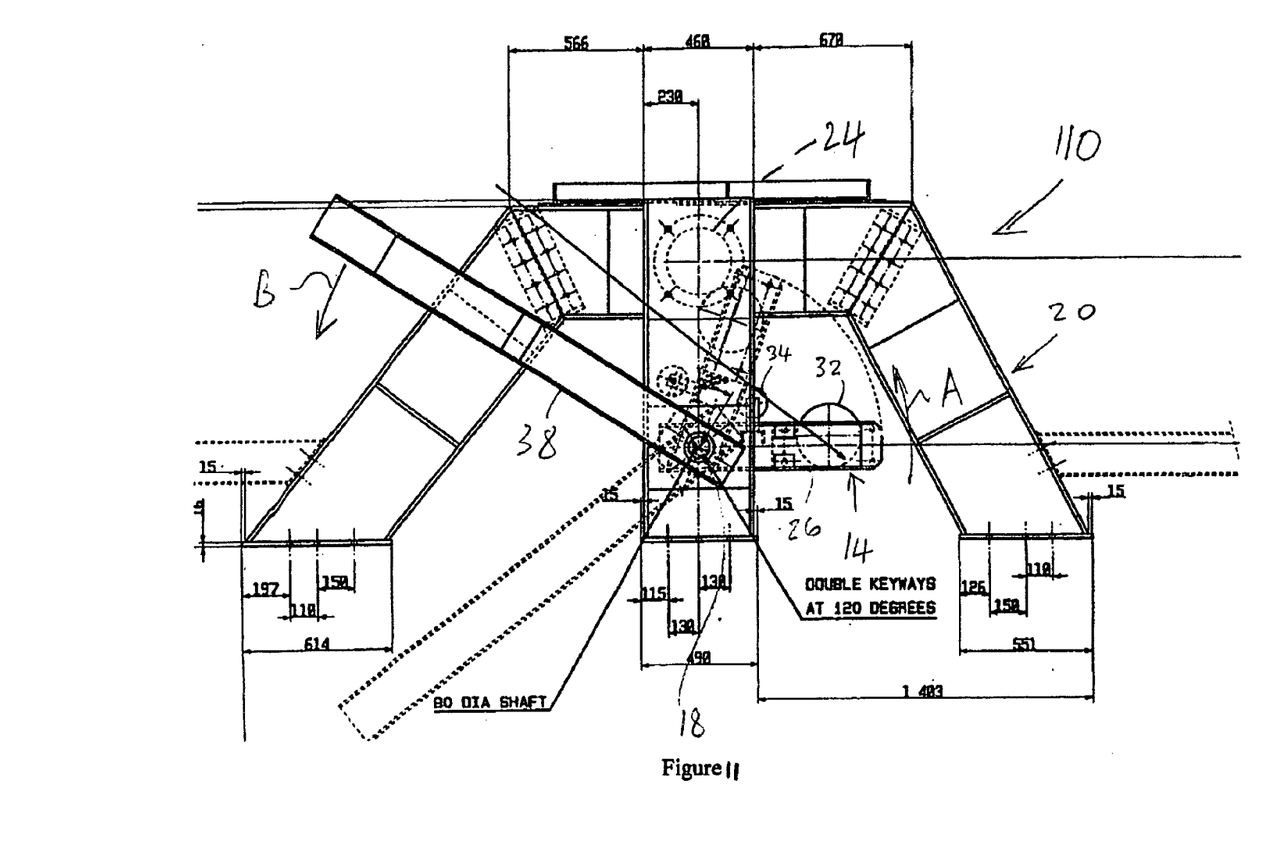

As can be seen in FIGS. 6 and 9, cross-bracing members 114 are provided to strengthen and aid stabilisation of the support members 16, the cross-bracing members 114 being connected, typically welded, to gussets 116 at the bases of the diagonally opposing legs 118 of the side supports 20.

The conveyor assembly 12 includes guide rollers 120 and 122 arranged on the beams 22 to guide the belt 36 during normal operation.

Figure 3:
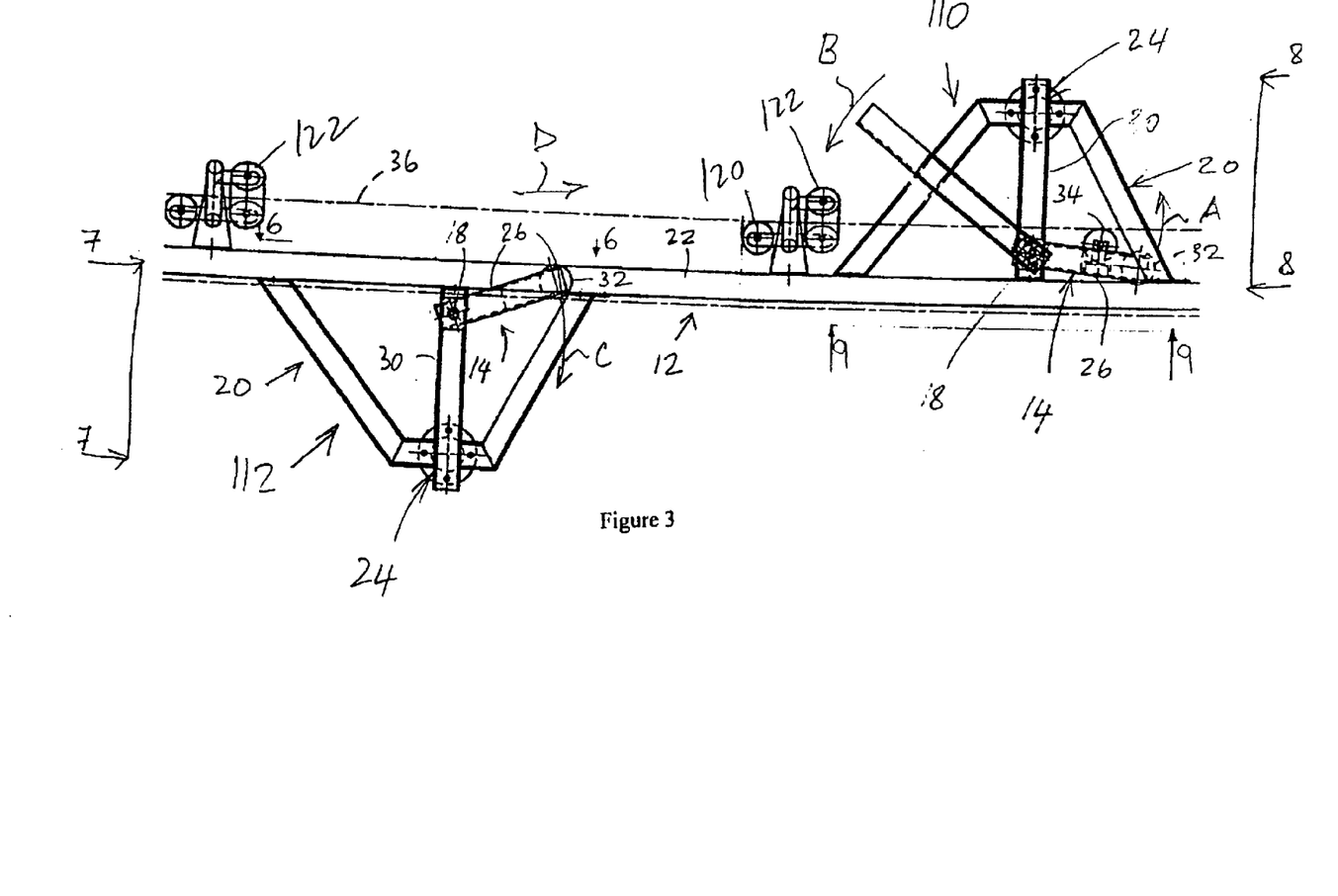
FIGS. 3 to 5 show a schematic side view of the retaining devices in accordance with the invention in an inoperative condition; at an initial stage following a loss of tension in a belt of a conveyor assembly and an operative retaining condition respectively.
Figure 4:
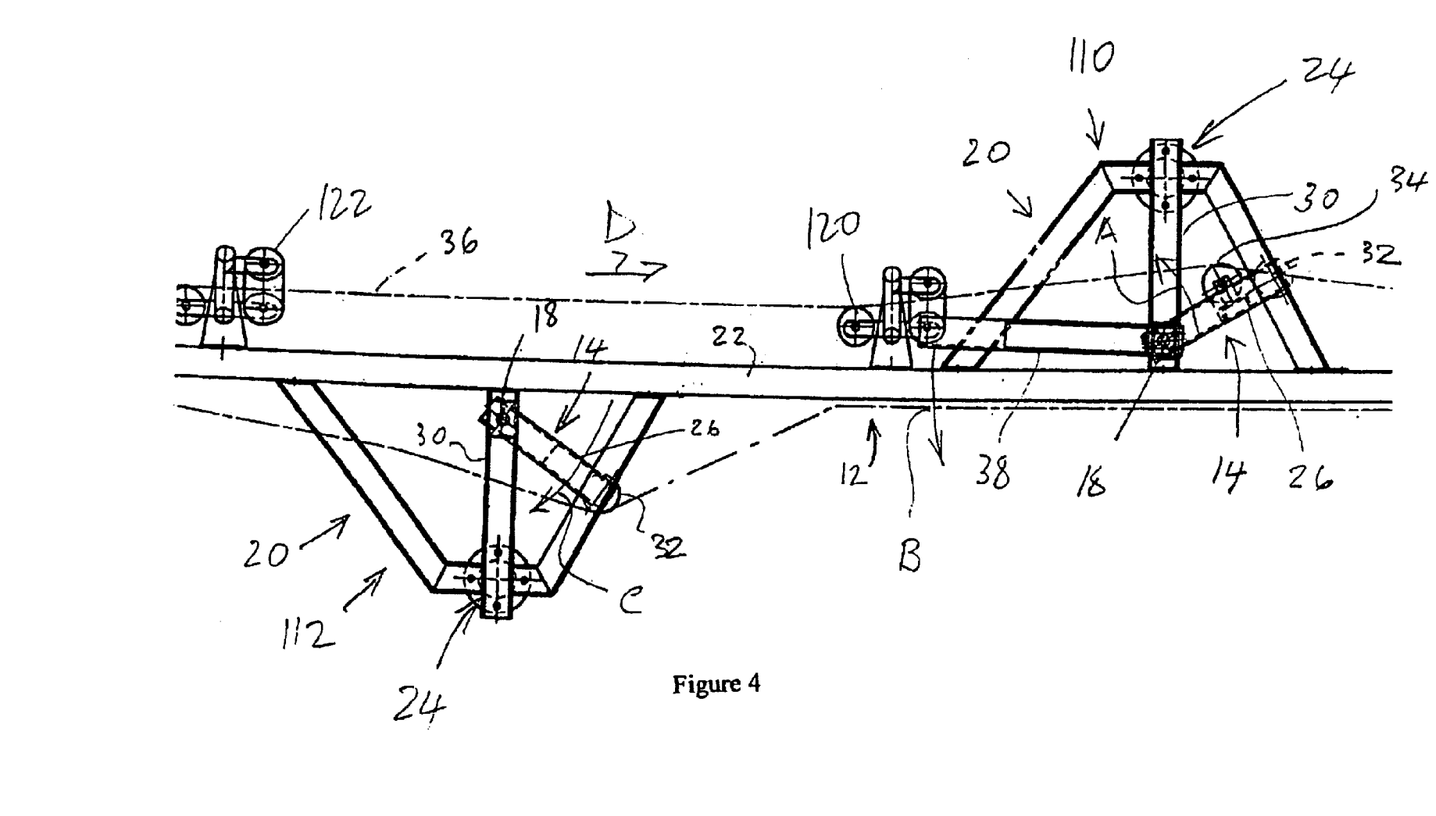
Figure 5:
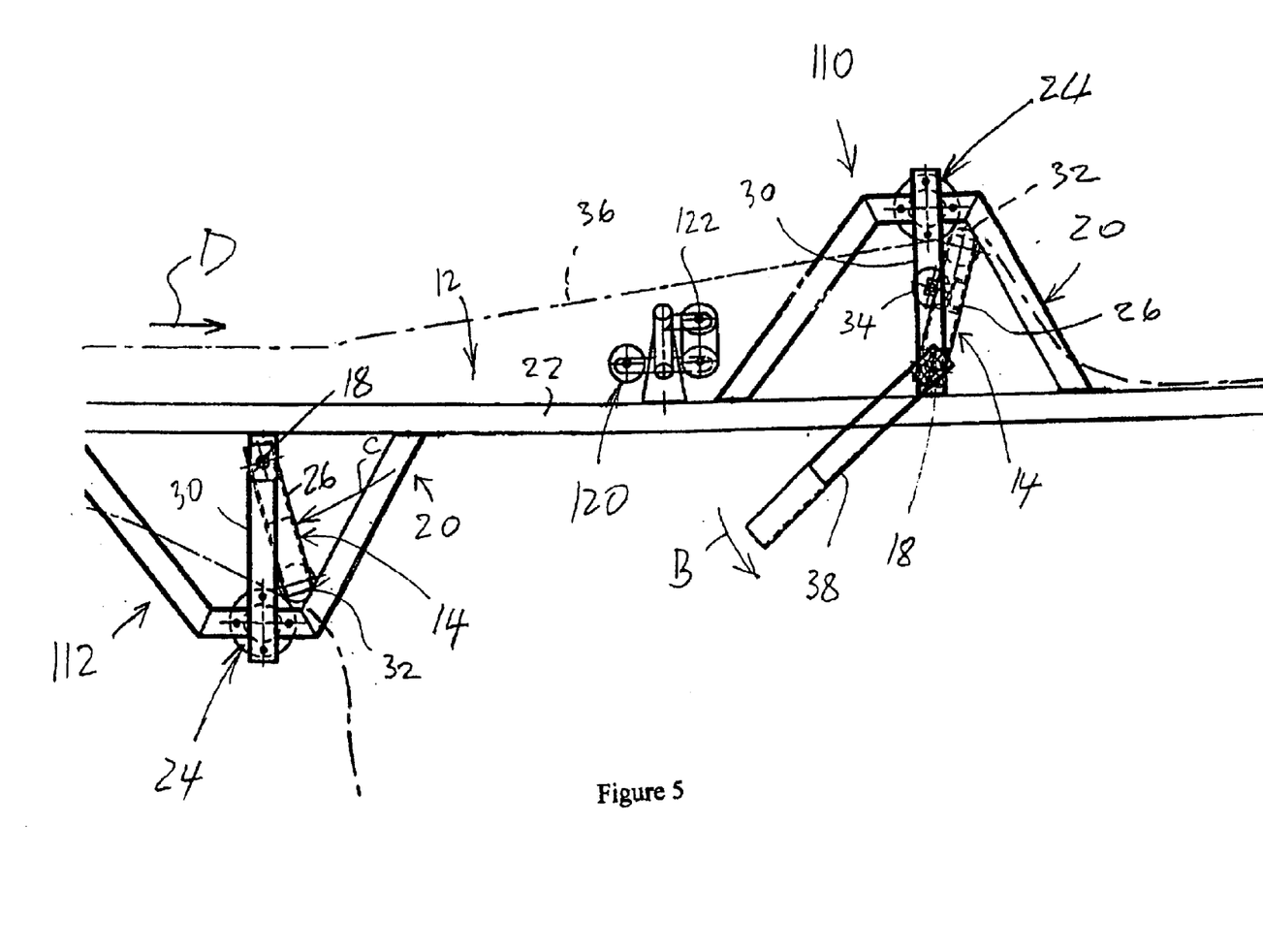

In normal operation as shown in FIG. 3 with the belt 36 moving in the direction of arrow "i", the belt 36 rests on and is guided by the guide rollers 34, 120 and 122. The applicant has found through observation and experiment that as most breakages or severing of the belt 30 occurs within 20 m and typically within 3 m of the head and/or drive roller (not shown) which is typically located at the highest point or end of the conveyor assembly 12, the retaining devices 110 and 112 are arranged within 3 to 20 meters of the said head and/or drive roller. Accordingly, as the belt 36 breaks, the consequent loss in tension therein leads to the pivotal displacement of the clamping members 14 and with it the belt 36 in the direction of arrows "A" and "C" (as shown in FIG. 4) towards the retaining condition (FIG. 5) wherein. the belt 36 is clamped and retained between the rods 24 and 32 thereby to inhibit spillage of for example, material being carried or transported thereon. The retaining devices 110 and 112 thus serve to retain the belt 36 in a tensioned condition at its new "free or severed ends" following breakage of the belt 36 to facilitate the removal of the material therefrom and subsequent repair of the belt 36 in situ.

It is to be appreciated that any number of retaining devices 110 and 112 can be arranged on the conveyor assembly 12 according to a user's needs and/or the configuration of the conveyor assembly 12 such as for example the length of the belt 36.

In another embodiment of the invention (not shown), a suitably weighted or spring biased clamping rod may be mounted slidably on the support 20 at least partially above roller of the conveyor assembly 12 so that in the event of detection of a loss of tension in the belt 36 by any suitable tension detection device, the damping rod would be moved under operation of gravity or by the spring into a clamping condition wherein the belt is damped and retained in position between the rod and the roller.

The applicant behaves that the retaining device in accordance with the invention is advantageous in that it provides a simplified, robust, time saving and cost effective means of inhibiting spillage of material carried by the belt 36 when the belt 36 breaks.

The retaining device in accordance with the invention is not limited to the precise constructional details as hereinbefore described. For example, The rods 24 and 32 may be rotatably mounted on the supports 20 and arms 26 respectively and may be of any suitable cross-sectional shape or length

What is claimed is:

1. A retaining device for a conveyor belt assembly wherein the retaining device comprises:

a clamping means for clamping a conveyor belt of the conveyor belt assembly, whereby the clamping means comprises a support member and a clamping member which is mounted displaceably thereon, wherein the clamping member is slidably mounted on the support member; and a biasing means for displacing the clamping means between an inoperative condition and an operative retaining condition wherein the clamping means clamps a part of the belt to tension a material carrying portion of the belt in the event of a loss of tension in the belt, the biasing means comprising a weighted arm which is connected to the clamping member for displacing the clamping member towards the retaining condition under operation of gravity, the displacing having been induced by a loss of tension in the belt.

2. A retaining device as claimed in claim 1 wherein the clamping member is pivotally mounted on the support member.

3. A retaining device as claimed in claim 1 wherein the support member is mountable on a support frame of the conveyor.

4. A retaining device as claimed in claim 1 wherein complementary clamping formations are provided on the clamping and support members to facilitate clamping of the belt therebetween in the operative retaining condition.

5. A retaining device as claimed in claim 4 wherein the clamping formations are configured to span a major part of a width of the belt.

6. A retaining device for a conveyor belt assembly wherein the retaining device comprises:

a clamping means for clamping a conveyor belt of the conveyor belt assembly, whereby the clamping means comprises a support member and a clamping member which is mounted displaceably thereon, wherein the clamping and support members are substantially "U"-shaped, the clamping member being adapted to move the belt towards and in to engagement with the support member in the retaining condition; and a biasing means for displacing the clamping means between an inoperative condition and an operative retaining condition wherein the clamping means clamps a part of the belt to tension a material carrying portion of the belt in the event of a loss of tension in the belt, the biasing means comprising a weighted arm which is connected to the clamping member for displacing the clamping member towards the retaining condition under operation of gravity, the displacing having been induced by a loss of tension in the belt.

7. A retaining device as claimed in claim 6 wherein the clamping member is pivotally mounted on the support member.

8. A retaining device as claimed in claim 6 wherein the support member is mountable on a support frame of the conveyor.

9. A retaining device as claimed in claim 6 wherein complementary clamping formations are provided on the clamping and support members to facilitate clamping of the belt therebetween in the operative retaining condition.

10. A retaining device as claimed in claim 9 wherein the clamping formations are configured to span a major part of a width of the belt.

11. A conveyor belt assembly which comprises one or more retaining devices, wherein the devices are spaced apart from one another along a length of the conveyor belt, wherein at least one device comprises a clamping means for clamping the conveyor belt of the conveyor belt assembly, whereby the clamping means comprises a support member and a clamping member which is mounted displaceably thereon, and a biasing means for displacing the clamping means between an inoperative condition and an operative retaining condition wherein the clamping means clamps a part of the belt to tension a material carrying portion of the belt in the event of a loss of tension in the belt, the biasing means comprising a weighted arm which is connected to the clamping member for displacing the clamping member towards the retaining condition under operation of gravity, the displacing having been induced by a loss of tension in the belt.

12. A conveyor belt assembly as claimed in claim 11, wherein the retaining devices are arranged on a support beam of the assembly within 20 meters of a head roller or a drive roller of the assembly.

13. A conveyor belt assembly as claimed in claim 12, wherein the retaining devices are arranged on an upper-side of the support beam.

14. A conveyor belt assembly as claimed in claim 12, wherein the retaining devices are arranged on an under-side of the support beam.

15. A conveyor belt assembly as claimed in claim 12, wherein the retaining devices are arranged on an under-side and an upper-side of the support beam.

16. A conveyor belt assembly as claimed in claim 12, wherein the retaining devices are arranged on a support beam of the assembly within 3 meters of a head roller or a drive roller of the assembly.

* * * * *